July 11, 1939. F. M. WILLIAMSON 2,165,598
VANITY CASE
Filed Sept. 29, 1937
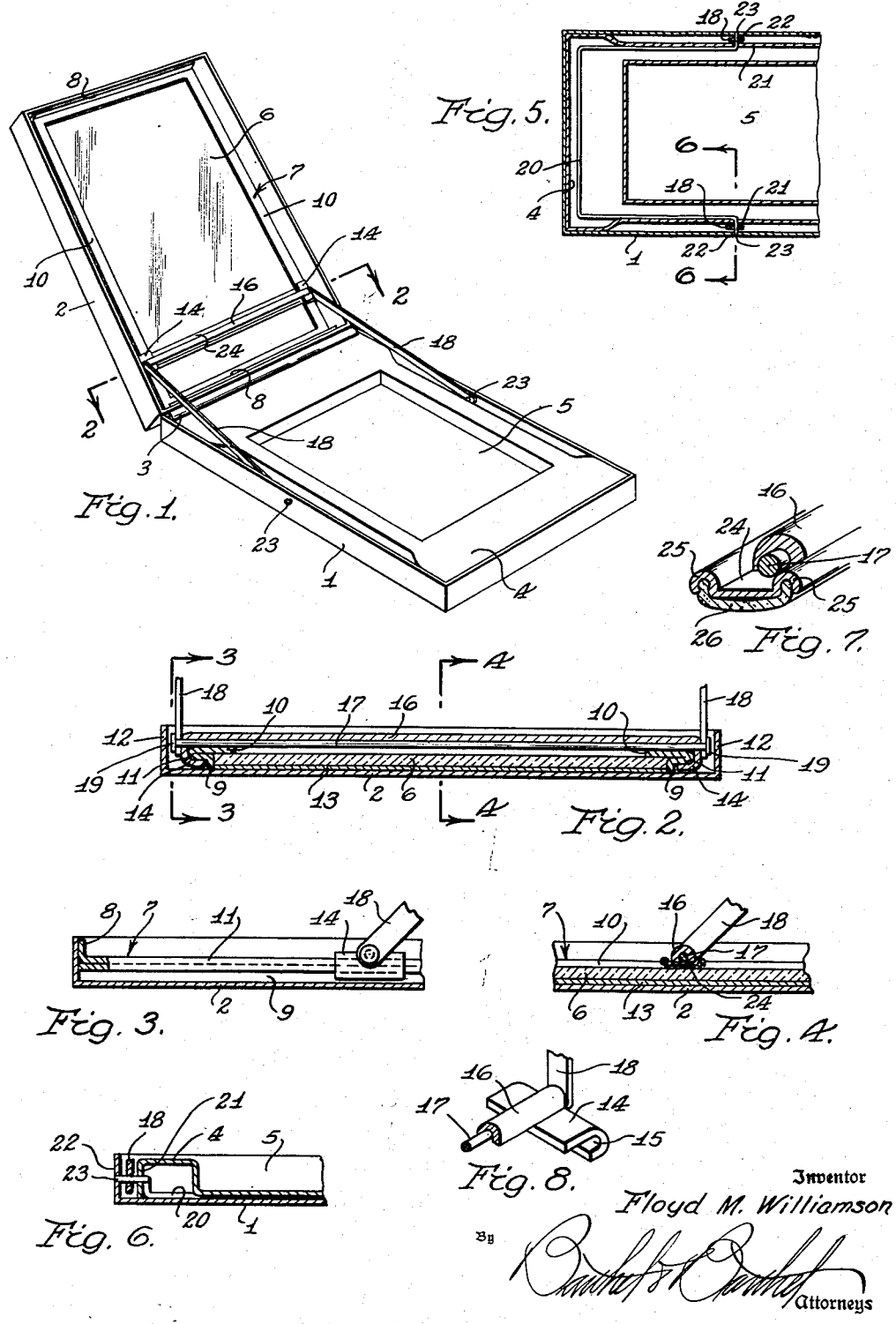
Inventor
Floyd M. Williamson
By
Attorneys Patented July 11, 1939

2,165,598

UNITED STATES PATENT OFFICE 2,165,598

VANITY CASE

Floyd M. Williamson, Detroit, Mich.

Application September 29, 1937, Serial No. 166,391

20 Claims. (Cl. 132—8.3)

The present invention relates to vanity cases. Such cases embody a mirror which usually becomes obscured by the collection of powder thereon and it is necessary, in order for the mirror to be used, that the powder be removed therefrom. The invention pertains more particularly to means for wiping the mirror by causing reciprocation of a wiper across the face of the mirror incident to opening and closing movement of the relatively hinged vanity case parts.

In my prior Patent No. 2,005,835, issued June 25, 1935, I have disclosed and claimed means for moving a wiper bar over the face of a mirror and have disclosed means for moving the wiper incident to opening and closing movement of relatively hinged vanity case parts. This invention relates to improvements thereon.

The present vanity case embodies relatively hinged parts, one of which is adapted to contain cosmetics and the other having a mirror or reflecting surface. The main object of this invention is to provide a combined mirror frame and wiper guide which results in economical manufacture, ease of assembly, and an improved wiping function. The mirror frame has two opposed sides formed to constitute guides for a pair of hook-like slidable elements which are united across the face of the mirror by a rigid bar, the slidable elements being movable in unison along their respective guides to carry the bar across the face of the mirror. A wiper element is carried by the rigid bar and cleans the mirror face as it moves therewith.

In order to move the wiper supporting bar automatically incident to opening and closing of the vanity case parts, two links are pivotally connected to the cosmetic containing part and have their free ends connected to respective slidable elements. And another object of the invention relates to the manner of connecting the links to the slidable elements and wiper supporting bar. That is, the links are so connected to the slidable elements and wiper supporting bar that during opening of the vanity case the wiper is firmly pressed into contact with the mirror surface to ensure an efficient wiping action. During closing of the vanity case the reverse condition exists, or in other words, the wiper bar only lightly engages the mirror face. This function eliminates friction between the wiper and mirror face during closing of the vanity case whereby the latter may be more easily closed, and also increases the useful life of a wiper.

Another object of the invention is to provide a device of the character above mentioned wherein the wiper element embodies a channel-shaped metallic reenforcement which is retained in engagement with the mirror face by engagement of the rigid element (which unites the two slidable elements) therewith.

Another object of the invention is to provide means for pivotally mounting the links with respect to the cosmetic containing parts whereby the links may be quickly and easily connected thereto or, if need arise, disconnected therefrom.

With the above and other ends in view the invention is more fully disclosed with reference to the accompanying drawing, in which:

Figure 1 is a perspective view of the vanity case;

Fig. 2 is a section taken on the line 2—2 of. Fig. 1;

Figs. 3 and 4 are sections taken respectively on lines 3—3 and 4—4 of Fig. 2;

Fig. 5 is a fragmental section illustrating a detail;

Fig. 6 is a section taken on the line 6—6 of Fig. 5;

Fig. 7 is a section illustrating a detail, and

Fig. 8 is a fragmental perspective of one of the slidable elements.

Like characters of reference are employed throughout to designate corresponding parts.

The present vanity case embodies two relatively hinged parts, the part I being in the nature of a box and the part 2 being hingedly connected thereto at 3 whereby it constitutes a cover for the box. Within the box part I is an inverted box-like element 4 having a depressed or deformed portion 5 comprising a receptor for powder or other cosmetics or cosmetic accessories. Within the cover part 2 is a mirror 6 and, when the vanity case is closed and carried about, as in a pocket or hand-bag, there is a tendency for dust from the powder or cosmetics contained in the receptor 5 to accumulate or collect upon the mirror face to obscure the same and to make it essential that it be wiped before it can again be used upon opening of the vanity case.

In my prior patent, above identified, I have disclosed and claimed a wiper element which automatically cleans the mirror incident to relative movement of hingedly connected vanity case parts and the present invention relates to novel features of construction relating to the mounting of the wiper element.

Referring to Figs. 1, 2 and 3, of the drawing the numeral 7 generally designates a frame for securing the mirror 6 in the cover 2. The frame 7 has two flanges 8 secured to opposite ends of the cover 2 to retain it therein, the frame extending the entire length of the cover. The frame has two parallel side portions 9, engaging the side edges of the mirror 6, and inwardly directed walls 10 engaging the face of the mirror to retain it between the walls 9. Also formed integral with the mirror frame are two guide rails 11 which extend parallel and are slightly spaced inwardly from the side walls 12 of the cover 2. A pad 13 is provided beneath the mirror.

Slidably mounted on respective guide rails 11 are shoe members 14 having a groove formation 15, the walls of which engage both top and bottom surfaces of the guide rails. The two shoe members are rigidly united by a transverse inverted channel-shaped bar 16 and an elongated pin 17, received in the channel bar 16, has its opposite ends projecting beyond respective shoe members 14. Links 18 are swingably retained on respective ends of the pin 17 by heads 19.

Within the box member 1, and enclosed by the receptor member 4, is a substantially U-shaped spring wire 20, the ends 23 of which are bent outwardly and extend through apertures in the side walls 21 of the receptor member 4 and the side wall portions 22 of the box part 1. The wall portions 21 and 22 are spaced apart slightly for reception of the links 18, and the latter have their free ends connected to the ends 23 of the wire member and are pivotally retained with respect to the box part 1 thereby.

It becomes apparent from the foregoing that the links 18 cause the channel bar 16 to move across the face of the mirror 6 incident to hinging movement of the parts 1 and 2. A wiper is carried by the channel bar 16 in order that such movement thereof may be utilized to clean the mirror surface of any cosmetics or powders which might have settled thereon. The wiper comprises a metallic member 24 deformed at 25 to provide two parallel grooves extending throughout the length thereof at the sides thereof. A wiping member 26, preferably formed of chamois, has its side edges received and retained in the groove formations 25. As may be seen in Fig. 7, the wiping chamois is not drawn tautly across the lower face of the metallic element 24, but is loose. The looseness of the wiping member contributes to a more efficient wiping action.

The deformed groove-providing formations 25 are entirely disposed above the plane of the lower face of the metallic member 24, and they project above the top face thereof to provide a channel or groove. When the wiper is assembled, the channel bar 16 extends through this groove or channel and holds the wiping member 26 against the face of the mirror, and by engagement of the channel bar with the formations 25 the wiper is caused to move with the channel bar as the latter is moved incident to opening and closing movement of the cover 2 relative to the box part 1.

One advantage of the structure above described is that a standard type of vanity case may be easily converted into an improved case of the type here shown. That is, the ordinary mirror frame may be discarded, and the present type of frame with the wiper actuating means mounted thereon may be substituted therefor with very little trouble. The means for retaining the link ends relative to the box part may be easily assembled into a standard case inasmuch as the only change required is in the provision of the apertures for the ends 23 of the wire member 20.

An important advantage results from the means for connecting the links to the wiper means. It will be noted that the links 18 are connected to pin 17 at points located outwardly of the sliding shoes 14 and, as the cover 2 is moved away from the box 1, these links exert a pull on the ends of the pin. Because the parts of the mechanism are all formed of comparatively light stock, the pull exerted on the ends of the pin in this manner tends to flex the same, and this flexing tendency is in a direction to press the wiper more firmly into contact with the mirror surface. Conversely, when the cover 2 is moved toward the box 1, the links exert a push against the pin 17 and tend to cause flexing of the pin in a direction relieving the pressure on the wiper, thus reducing the friction resulting from contact of the wiper with the mirror.

Although a specific embodiment of the invention has been illustrated and described it will be understood that various changes may be made within the scope of the appended claims without departing from the spirit of the invention, and such changes are contemplated.

What I claim is:

1. A vanity case composed of two parts relatively movable to open and closed positions, one of said parts containing a mirror and the other being adapted to contain cosmetics or the like, a wiper, means in the mirror part supporting said wiper for movement across the face of said mirror, means connected to the cosmetic part for actuating said wiper automatically incident to opening and closing movement of said parts, and means connecting said last named means to the wiper whereby the wiper is pressed more firmly into contact with the mirror during opening movement than during closing movement of the parts.

2. A vanity case composed of at least two parts relatively movable to open and closed positions, one of said parts having a mirror face, guides adjacent said mirror face, a wiper on said guides adapted to traverse the face of said mirror, means for moving said wiper, and means connecting said last named means to said wiper whereby upon opening the case the wiper is caused to be pressed firmly into engagement with the mirror while closing the case causes such pressure to be relieved from said wiper.

3. A vanity case composed of at least two parts relatively movable to open and closed positions, one of said parts having a mirror face, guides adjacent said mirror face, a wiper on said guides adapted to traverse the face of said mirror, means for moving said wiper, said means being connected to the other case part for actuation thereby incident to opening and closing movement of the two case parts, and means connecting said last named means to said wiper whereby upon opening movement of the parts said connecting means press the wiper firmly into contact with the mirror face and remove such pressure during its reverse movement.

4. A vanity case composed of at least two parts relatively movable to open and closed positions, one of said parts having a mirror face, guides adjacent said mirror face, a wiper on said guides adapted to traverse the face of said mirror, and means secured to said wiper outwardly of said guides for sliding said wiper across the face of the mirror and exerting varying pressures thereon during opening and closing of the case parts.

5. A vanity case composed of at least two parts relatively movable to open and closed positions, one of said parts having a mirror face, guides adjacent said mirror face, a wiper on said guides adapted to traverse the face of said mirror, and means for sliding said wiper across the face of said mirror and exerting varying pressures thereon during opening and closing of the case parts, said last named means being connected to said wiper outwardly of said guides and to the other case part for actuation automatically incident to opening and closing movement of the two parts.

6. A vanity case composed of two relatively movable parts, one of said parts having a mirror face and the other being adapted to contain cosmetics or the like, guides adjacent said mirror face, a wiper bar slidable on said guides and adapted to traverse said mirror face, a wiper connected to said wiper bar, a flexible actuator for said wiper bar adapted when flexed in one direction to engage and press the wiper into firm engagement with the mirror face and when flexed in the other direction to relieve the wiper of such pressure, and means disposed outwardly of said guides for moving and so flexing said wiper actuator.

7. A vanity case composed of two relatively movable parts, one of said parts having a mirror face and the other being adapted to contain cosmetics or the like, guides adjacent said mirror face, a wiper bar slidable on said guides and adapted to traverse said mirror face, a wiper connected to said wiper bar, a flexible actuator for said wiper bar adapted when flexed in one direction to engage and press the wiper into firm engagement with the mirror face and when flexed in the other direction to relieve the wiper of such pressure, and means disposed outwardly of said guides and connecting said actuator to said cosmetic containing part whereby said actuator moves reversely and flexes reversely incident to reverse relative movement of the two case parts.

8. A vanity case composed of two relatively movable parts, one of said parts having a mirror face and the other being adapted to contain cosmetics or the like, guides adjacent said mirror face, a wiper bar slidable on said guides and adapted to traverse said mirror face, a wiper connected to said wiper bar, a flexible actuator for said wiper bar adapted when flexed to engage the wiper, said flexible actuator having its ends extending outwardly of the wiper guides, and means connecting said extending ends to the cosmetic containing part whereby it moves and flexes incident to relative movement of the case parts.

9. In a vanity case, a mirror, a frame secured in said case and retaining said mirror therein, two opposed sides of said frame being spaced from the case walls and being formed to provide guides, hook-like shoes slidably received on said guides, a transverse member extending across the face of said mirror beyond said guides and uniting said shoes for movement in unison, and a wiper on said transverse member for traversing said mirror incident to a sliding movement of the shoes.

10. In a vanity case, a mirror, a frame secured in said case and retaining said mirror therein, two opposed sides of said frame being spaced from the case walls and being formed to provide guides, hook-like shoes slidably received on said guides, a transverse member extending across the face of said mirror and uniting said shoes for movement in unison, a wiper having a channel through which said transverse member extends whereby sliding movement of the shoes causes the wiper to traverse the face of said mirror, a flexible element in said transverse member and extending beyond said guides, and means secured to the extended portions of said element for moving said element to impart sliding movement to the shoes and for flexing said element during opening movement of the case to press the wiper into firm engagement with the mirror face.

11. In a vanity case composed of relatively movable parts, a mirror in one part, a frame secured in said part and retaining the mirror therein, two sides of said frame being formed to provide guides, hook-like shoes slidably received on opposite guides and united by a transverse member extending across the face of said mirror, a wiper mounted on said transverse member for traversing the face of the mirror incident to sliding movement of said shoes, and means connected to said transverse member outwardly of said guides and connecting said shoes to the other case part for actuation by relative movement of the two case parts.

12. In a vanity case composed of relatively movable parts, a mirror in one part, a frame secured in said part and retaining the mirror therein, two sides of said frame being formed to provide guides, hook-like shoes slidably received on opposite guides and united by a transverse member extending across the face of said mirror, a wiper having retaining means engaged by said transverse member whereby it traverses the mirror incident to sliding movement of the shoes, a flexible actuator adapted when flexed in one direction to press the wiper into firm engagement with the mirror face, and means connecting said flexible actuator with the other case part whereby it is moved and is flexed incident to relative movement of the two case parts.

13. In a vanity case composed of relatively movable parts, a mirror in one part, a frame secured in said part and retaining the mirror therein, two sides of said frame being formed to provide guides, hook-like shoes slidably received on opposite guides and united by a transverse member extending across the face of said mirror, a wiper having retaining means engaged by said transverse member whereby it traverses the mirror incident to sliding movement of the shoes, a flexible actuator adapted when flexed in one direction to press the wiper into firm engagement with the mirror face, the ends of said flexible element extending outwardly of opposite shoes, and means connecting the ends of said flexible element to the other case part.

14. A vanity case having relatively hinged parts, one part having a mirror face, a wiper mounted for movement across the mirror face, links connected to said wiper for moving the same, and means connecting the links to the other case part whereby the wiper is moved incident to relative movement of the two parts, said means comprising pivot pins engaging the ends of respective links, retainers for supporting said pins, and resiliently yieldable means independent of the first mentioned part and normally holding said pins in said retainers and in engagement with the links.

15. A vanity case having relatively hinged parts, one part having a mirror face, a wiper mounted for movement across the mirror face, links connected to said wiper for moving the same, said other part having pivot pin retainers, pivot pins removably engaging said links and retainers, and resilient means independent of the first mentioned part and normally maintaining said pins in engagement with said links and retainers.

16. A vanity case having relatively hinged parts, one part having a mirror face, a wiper mounted for movement across the mirror face, links connected to said wiper for moving the same, said other part having pivot retainers, and a substantially U-shaped spring member confined in the second mentioned part and having its ends received in said retainers and engaging and pivotally supporting the ends of said links.

17. A vanity case having relatively hinged parts, one part having a mirror face, a wiper mounted for movement across the mirror face, links connected to said wiper for moving the same, said other part having pivot retainers, a substantially U-shaped spring member having its ends received in said retainers and engaging and pivotally supporting the ends of said links, and an inverted box-like member enclosing said spring member, said box-like member having a receptor for cosmetics and the like.

18. A vanity case having relatively hinged parts, one part having a mirror face, a wiper mounted for movement across the mirror face, links connected to said wiper for moving the same, an inverted box-like member in said other part having side walls spaced from adjacent side walls of said other part, said spaced walls having aligned apertures, and pins extending through aligned sets of apertures for pivotally securing the ends of said links between the spaced apart walls.

19. A vanity case having relatively hinged parts, one part having a mirror face, a wiper mounted for movement across the mirror face, links connected to said wiper for moving the same, an inverted box-like member in said other part having side walls spaced from adjacent side walls of said other part, said spaced walls having aligned apertures, pins extending through aligned sets of apertures for pivotally securing the ends of said links between the spaced apart walls, and resiliently yieldable means confined within the second mentioned part below said member and holding respective pins in respective sets of apertures.

20. A vanity case having relatively hinged parts, one part having a mirror face, a wiper mounted for movement across the mirror face, links connected to said wiper for moving the same, an inverted box-like member in said other part having side walls spaced from adjacent side walls of said other part, said spaced walls having aligned apertures, pins extending through aligned sets of apertures for pivotally securing the ends of said links between the spaced apart walls, and a spring member integral with said pins and confined below said first member and yieldably holding the pins in respective apertures.

FLOYD M. WILLIAMSON.